(12) United States Patent
Daoud et al.

(10) Patent No.: US 6,980,726 B2
(45) Date of Patent: Dec. 27, 2005

(54) FIBER BEND LIMITING DEVICE WITH A DUST SEALING FEATURE

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 124 days.

(21) Appl. No.: 10/449,250

(22) Filed: May 30, 2003

(65) Prior Publication Data

US 2004/0240828 A1 Dec. 2, 2004

(51) Int. Cl.[7] .............................. G02B 6/00; G02B 6/46
(52) U.S. Cl. ...................................... 385/136; 385/137
(58) Field of Search ................................. 385/134–139

(56) References Cited

U.S. PATENT DOCUMENTS

| | | | |
|---|---|---|---|
| 6,188,826 B1 * | 2/2001 | Daoud ........................ 385/135 |
| 6,539,161 B2 * | 3/2003 | Holman et al. .............. 385/136 |
| 6,546,179 B2 * | 4/2003 | Petri ........................... 385/134 |
| 6,586,680 B1 * | 7/2003 | Nelson ........................ 385/135 |
| 6,845,207 B2 * | 1/2005 | Schray ........................ 385/135 |
| 2003/0165315 A1 * | 9/2003 | Trebesch et al. ............. 385/135 |
| 2004/0258384 A1 * | 12/2004 | Trebesch et al. ............. 385/135 |

* cited by examiner

Primary Examiner—Rodney Bovernick
Assistant Examiner—Omar Rojas

(57) ABSTRACT

Optical fiber bend limiter that prevents contaminates from entering an optical fiber closure is described. The optical fiber bend limiter has an arcuate portion having a bend radius for limiting a minimum bend of an optical fiber. The bend limiter has a central recess for inserting a wall of an optical closure therein and limiting the minimum bend radius of an optical fiber. The bend limiter also includes peripheral recesses. When desired, the bend limiter is secured to a wall of the optical fiber closure via the peripheral recesses thereby closing the aperture and protecting the optical fibers from contaminants.

10 Claims, 5 Drawing Sheets

FIBER BEND LIMITING DEVICE WITH A DUST SEALING FEATURE

BACKGROUND OF THE INVENTION

1. Field of the Invention

The present invention relates generally to optical fiber handling systems, and more particularly to an optical fiber bend limiter that prevents optical fiber bending less than its minimum radius and unwanted contaminates from entering a optical fiber closure.

2. Description of the Related Art

Due to the fragile nature of optical fiber, there is a need to protect the fiber from external sources of stress, such as bending, pressure and strain, which can damage the fiber and/or cause degradation of the signal being transmitted via the fiber. For example, a fiber should not be bent sharply anywhere along its path. In addition to the possibility of breakage or fracture, if a fiber is bent past a critical angle, portions of transmitted light pulses will leak out, rather than being reflected within the fiber core, thereby attenuating the transmitted light pulses and degrading signal quality. Accordingly, it is necessary that a fiber be routed so that bends in the fiber are of a sufficient radius to substantially avoid occurrence of such light leakage.

The radius below which a fiber should not be bent to avoid light ray leakage is characterized as the minimum bend radius. Typically, the minimum bend radius varies with fiber design. However, in all fiber designs, bending the fiber to a radius smaller than its minimum bend radius may result in increased signal attenuation and/or a broken fiber.

In many fiber administration systems, as the optical fibers in a network enter the central office, they are directed into an optical distribution frame where the individual optical fibers are terminated in an organized manner. Such fiber administration systems are exemplified by the LGX® fiber administration system that is currently manufactured by Lucent Technologies of Murray Hill, N.J., the assignee herein.

As optical fiber distribution systems evolve there is a need to install, remove, and/or reroute optical fiber jumper cables used for making connections within or among shelves in a distribution frame. As the distribution system evolves more or less optical fibers may be connected within an optical closure. As such, an aperture for the insertion of optical fibers may not be in use. However, one of the concerns in the evolution of network distribution systems is the ability to keep unwanted contaminants from entering the fiber optic closure through an unused aperture.

SUMMARY OF THE INVENTION

These and other deficiencies of the prior art are addressed by the present invention of an optical fiber bend limiter that prevents optical fiber bending less than its minimum radius while keeping unwanted contaminates from entering an optical fiber closure. In one embodiment, the optical bend limiter has a primary recess for inserting a wall of an optical closure therein and limiting the minimum bend radius of an optical fiber.

In yet another embodiment, the bend limiter also includes a first and second flange. The first and second flanges are opposed to each other. Longitudinal peripheral recesses are formed between the first and second flanges, respectively, and the arcuate surface. Each of the respective recesses formed between the flanges and the arcuate surface is, in one embodiment, substantially perpendicular to the first recess. As such, the bend limiter may be inserted into a wall of the optical fiber closure via the second and third recesses. Thus, in this embodiment the bend limiter closes the aperture and acts as a barrier towards unwanted contaminants.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

An optical fiber bend limiter device used in a fiber closure having improved environmental contaminant features is described. In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

Figure 1:
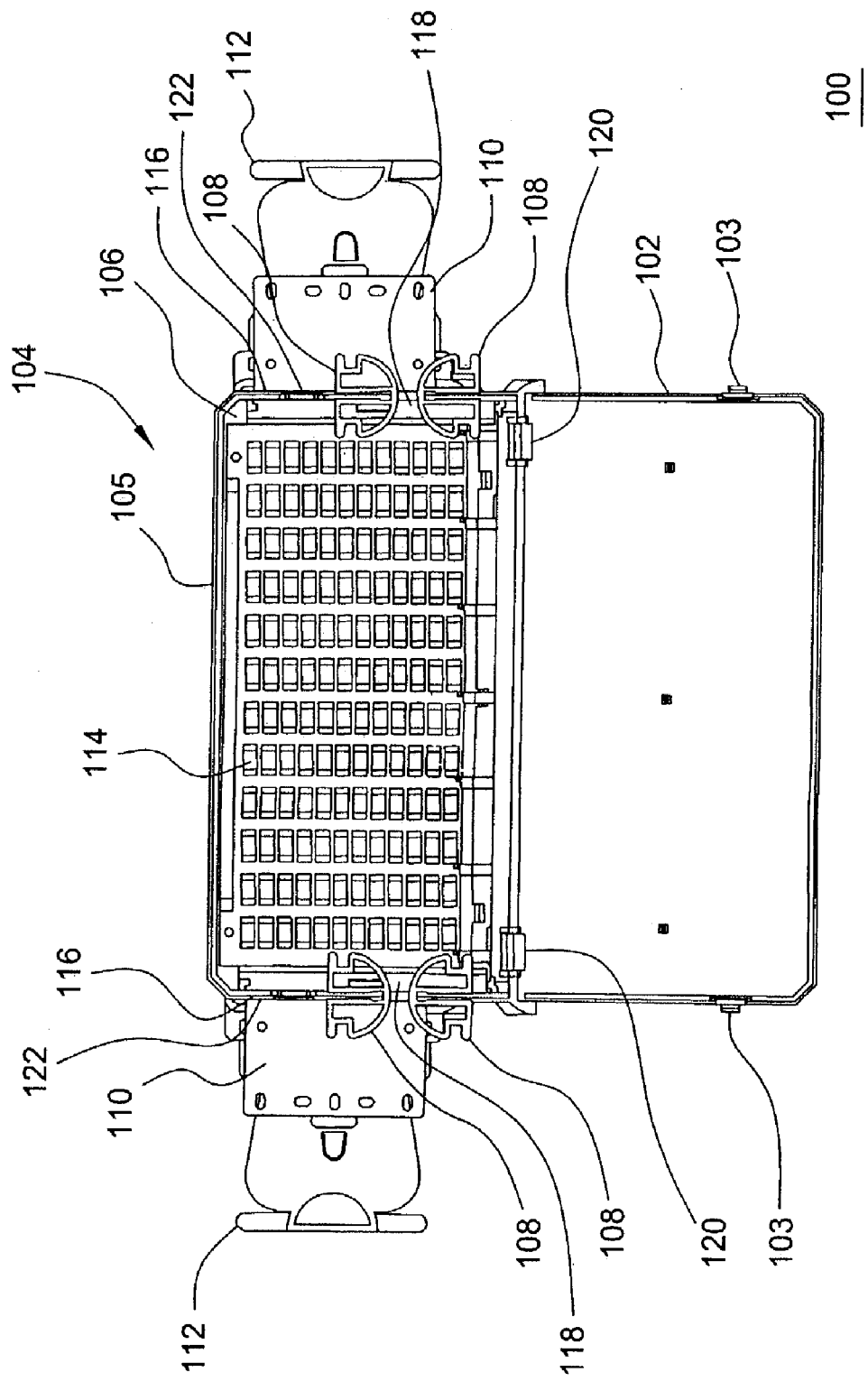
FIG. 1 depicts a plan view of an optical fiber closure adapted for use with an embodiment of the invention.

FIG. 1 is a plan view showing an exemplary embodiment of bend limiter 108 positioned within an optical fiber closure 100 in accordance with an aspect of the invention. Specifically, FIG. 1 depicts a rear view of the optical fiber closure 100. The optical fiber closure 100 includes a housing 104 and a rear cover 102. Although not shown in FIG. 1, the optical fiber closure 100 includes a front cover substantially similar to the rear cover 102.

Figure 2:
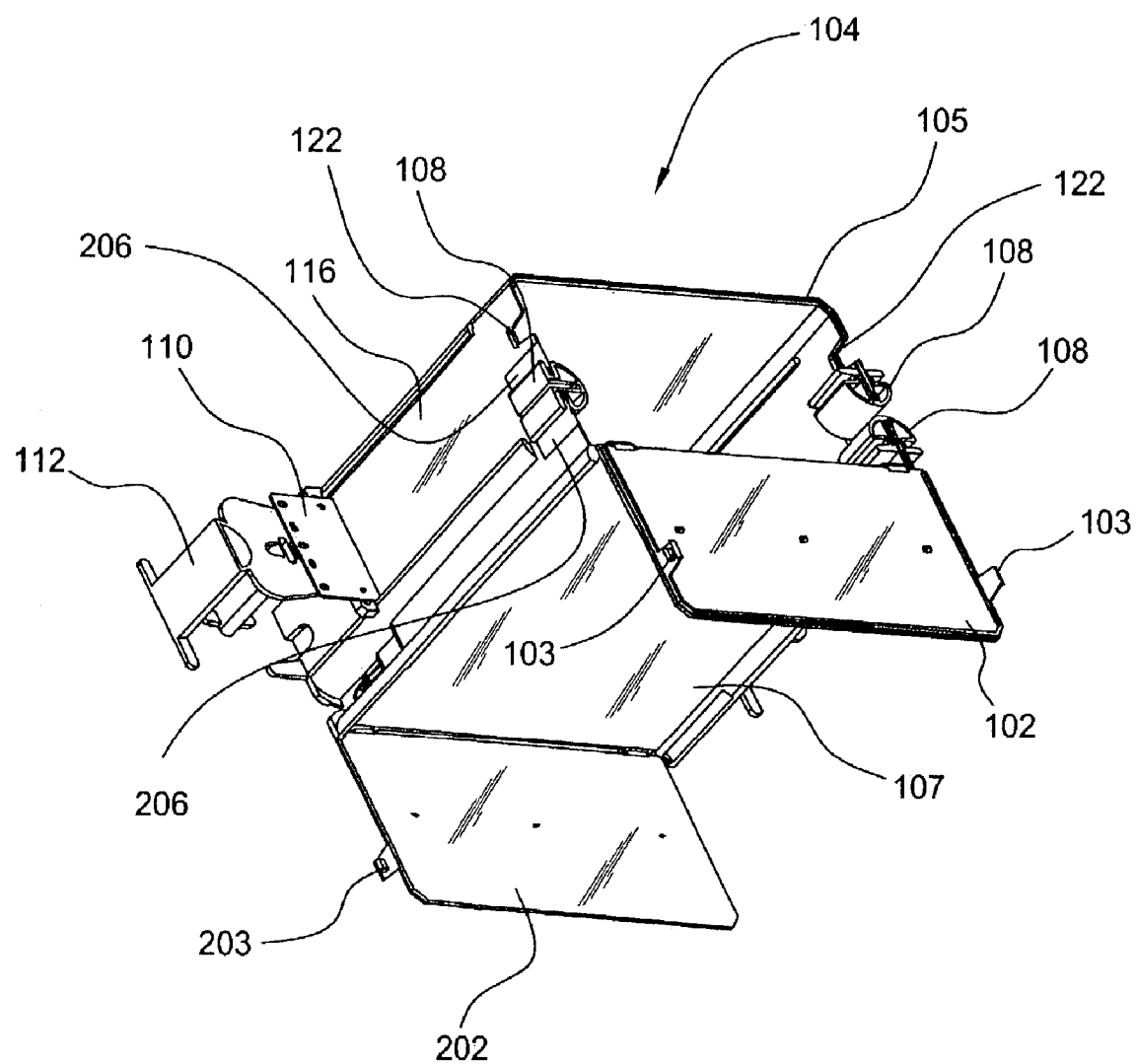
FIG. 2 depicts a different view perspective of an optical fiber enclosure adapted for use with the invention.

The housing 104 includes a top wall 105, a bottom wall 107 (as also seen in FIG. 2), connected by the opposing side walls 116. The housing 104 may be formed of sheet metal, plastic, or like type materials known to those skilled in the art. Each of the opposing side walls 116 includes an aperture 118 defined therein through which optical fibers (not shown) pass. The housing 104 includes a panel 106 mounted therein for supporting optical connectors within apertures 114. Optical fiber closure 100 is support by brackets 110 attached (disposed) on side walls 116. Bend limited optical fibers exit the housing 104 and enter troughs 112. Troughs 112 are attached to the support brackets 110.

The bottom 107 includes a pair of hinge members 120 for pivotally supporting the rear cover 102. The opposing side walls 116 include male latch members 103 disposed on the periphery of the rear cover 102 for securing the rear cover 102 to the housing 104. The housing 104 employs any of various types of hinge members 120 providing hinged motion between the housing 104 and the rear cover 102. Male latch members 103 are known in the art.

Bend limiters 108 are disposed within each of the apertures 118. Bend limiters 108 prevent optical fibers from being bent less by an amount than their minimum bend radii. Each bend limiter 108 is molded and designed to securely fit against the side walls 116 at the aperture 118. In one specific embodiment, two bend limiters 108 are opposedly positioned in aperture 118. Alternately, only one bend limiter 108 is positioned at aperture 118. FIG. 1 depicts the bend limiters 108 already inserted within apertures 118 located in the rear of housing 104.

It is noted that apertures 118 may be located in side walls 116 near the front of the housing 104 and that the bend limiters 108 may be inserted therein. FIG. 1 depicts apertures 118 of each respective sidewall 116 aligned with the aperture 118 of the opposing sidewall 116. However, the positioning of the apertures 118 with respect to each other and to their respective sidewalls 116 are for illustrative purposes only and not intended in any way to limit the scope of the invention. For example, in another embodiment of the invention one aperture 118 is positioned on a lower portion of its respective sidewall 116 and another aperture 118 is positioned on an upper portion of its respective sidewall 116. In addition, it is noted that in other embodiments apertures 116 and bend limiters 108 are placed in the top and bottom walls, 105 and 107 respectively, of housing 104.

To prevent an optical fiber from exceeding its minimum bend radius, at least one bend-limiting device 108 is inserted in a portion of the aperture 118. Illustratively, FIG. 1 depicts an embodiment having two pairs of bend limiting devices within apertures 118. Each pair of bend limiters 108 comprises two opposed bend limiters 108. Upon exiting the optic fiber closure 100, optical fibers are routed either upward or downward. As such, the optical fibers are bent towards either of the bend limiters 108. Each of the opposed bend limiters 108 prevents optical fibers from exceeding their minimum bend radius. The physical aspects of the bend limiters 108 are described in greater detail below with respect to FIGS. 3–4.

FIG. 2 depicts a perspective view of the bottom 107 of the housing 104 and optical fiber closure 100 depicted in FIG. 1. As such, many of the elements in FIG. 2 have already been described with respect to FIG. 1. For brevity, the elements already described in FIG. 1 will not be repeated in the discussion of FIG. 2. The reader is encouraged to refer to FIG. 1 when necessary.

Front cover 202 and its respective male latch members 203 (only one male latch member is viewable from the current perspective) operate similarly to that described with respect to rear cover 102 and its respective male latch members 103. As such, the operation of the front cover 202 will not be described further herein. Punch-outs 206 are disposed on side walls 116 and allow a user to increase the size of the aperture 118. Illustrative, the punch-outs 206 are depicted on either side of the bend limiter 108. The punch-outs 206 and apertures 118 are substantially perpendicular to the optic fibers leaving the optical fiber closure 100. Optic fibers are horizontally oriented & punch-outs are vertically oriented.

An unused aperture 118 exposes the optical fibers and optical connectors to unwanted contaminants (e.g., dust and insects). To address this issue, bend limiter 108 is configured to allow closure of the aperture 118 to prevent unwanted contaminants from entering the optical fiber enclosure 104 (described in further detail below).

Figure 3:
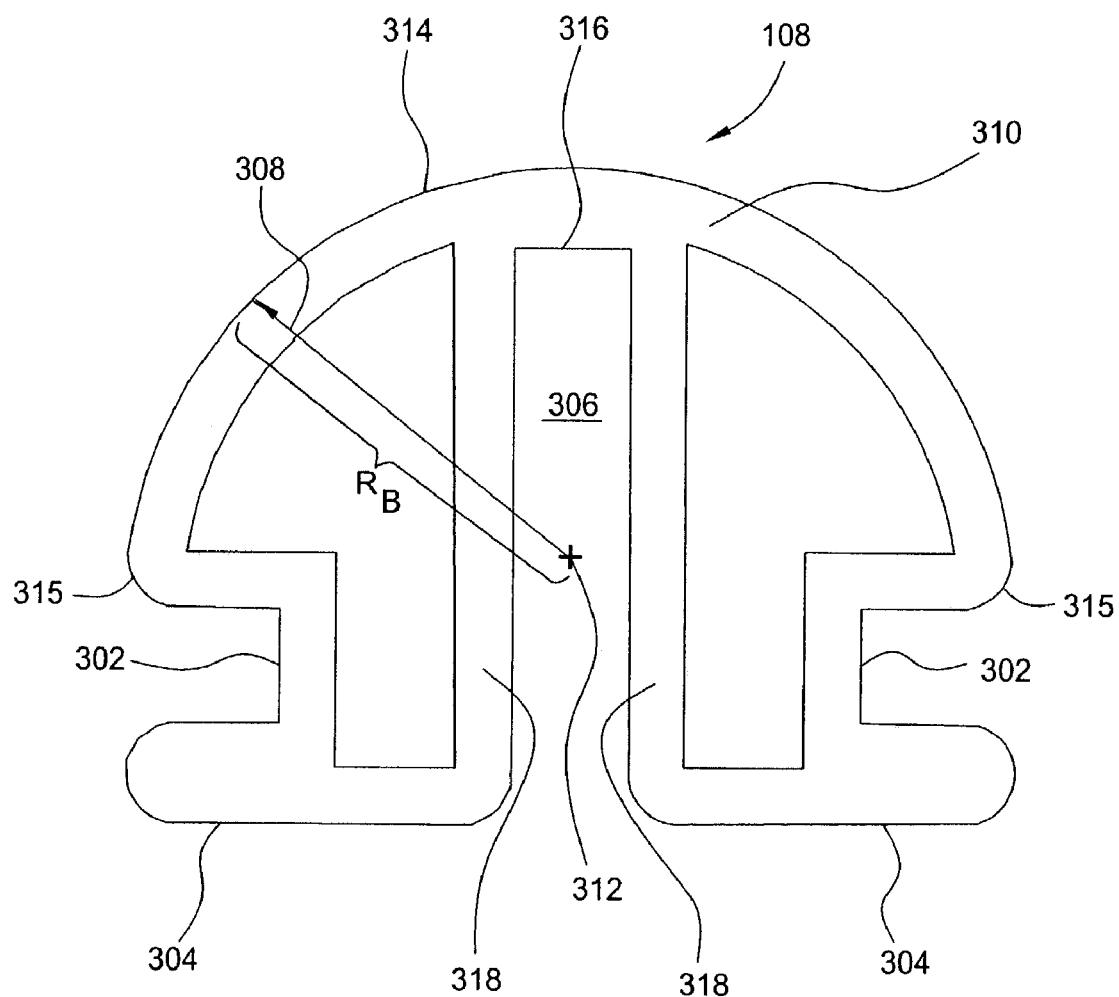
FIG. 3 depicts a cross-sectional view of an embodiment of the invention.

FIG. 3 depicts a side view of an embodiment of bend limiter 108. Specifically, bend limiter 108 contains an arcuate surface 314. Arcuate surface spans an angular distance of approximately 180 degrees. Arcuate surface 314 has a circumference that extends to end points 315 located on either end of arcuate surface 314. Peripheral recesses 302 are defined by an area between end points 315 and flanges 304. Peripheral recesses 302 are sufficient in size for the insertion and retention therein of side walls 116. In one embodiment of the invention, the peripheral recesses 302 have a depth of about ¼ inch each. The flanges 304 transition into substantially parallel walls 318. Substantially parallel walls 318 extend inside the bend limiter 108 and terminate at an adjoining substantially perpendicular inner wall 316. Bend limiter 108 may be formed of polyvinyl, polycarbonate (e.g., Lexan® produced by Nippon G. E. Plastics Co., Ltd.), or like type materials known to those skilled in the art. It is appreciated that the bend limiter 108 may be constructed of any material that is sufficiently rigid to support optical fibers and to prevent the optical fibers from bending less than their minimum bend radii.

Central recess 306 is defined by the substantially parallel walls 318 and the substantially perpendicular inner wall 316. Central recess 306 is sufficient in size to accommodate sidewalls 116. Center 312 is located within central recess 306. When needed, to limit the minimum bend radius of an optical fiber, the bend limiter 108 is positioned on the side wall 116 via central recess 306. The bend limiter 108 is secured to the side wall 116 by the proximity of the substantially parallel walls 318 to each other. Arcuate surface 314 has an angle determined by a bend radius $R_B$ 308. The bend radius $R_B$ 308 is a distance extending from a center 312 within central recess 306 to the arcuate surface 314. The type of optical fiber used determines the minimum bend radius constraints (i.e., the length of the bend radius $R_B$ 308).

Bend limiter 108 contains opposed peripheral recesses 302 on either side of the arcuate surface 314. The peripheral recesses 302 are substantially perpendicular to central recess 306. In addition, central recess 306 is substantially equidistant from each respective peripheral recess 302. The peripheral recesses also accommodate the side walls 116 to secure the bend limiter 108 to the optical fiber closure 100. For example, FIG. 2 depicts a bend limiter 108 inserted into aperture 118 of sidewall 116 with the arcuate surface 314 facing into the optical fiber closure 100. Specifically, when an existing aperture 108 is not needed, bend limiter 108 is rotated 90° with respect to the central recess 306 and secured to housing 104 via recesses 302. The 90° insertion illustratively shown in FIG. 2 has the arcuate surface 314 of the bend limiter 108 inside the optical fiber closure 100. As such, bend limiter 108 has closed aperture 108. Also, the bend limiter 108 can be secured to optical fiber closure 100 of sidewall 116 with the arcuate surface 314 on the outside of optical fiber closure 100.

For example, a determination may be made that the remaining bend limiters 108 are not needed to limit the minimum bend radius of optical fibers. A peripheral recess 302 of each of the respective bend limiters 108 may be inserted into the side wall 116. Peripheral recesses 302 have a depth substantially shorter than the depth of a central recess 306. Illustratively, each respective peripheral recess 302 has a depth of about ¼ inch while the central recess has a depth of about 1¼ inches. Accordingly, the bend limiters 108 inhabit a greater portion of an aperture 118 depending upon how the bend limiter 108 is inserted into the aperture 118.

Figure 4:
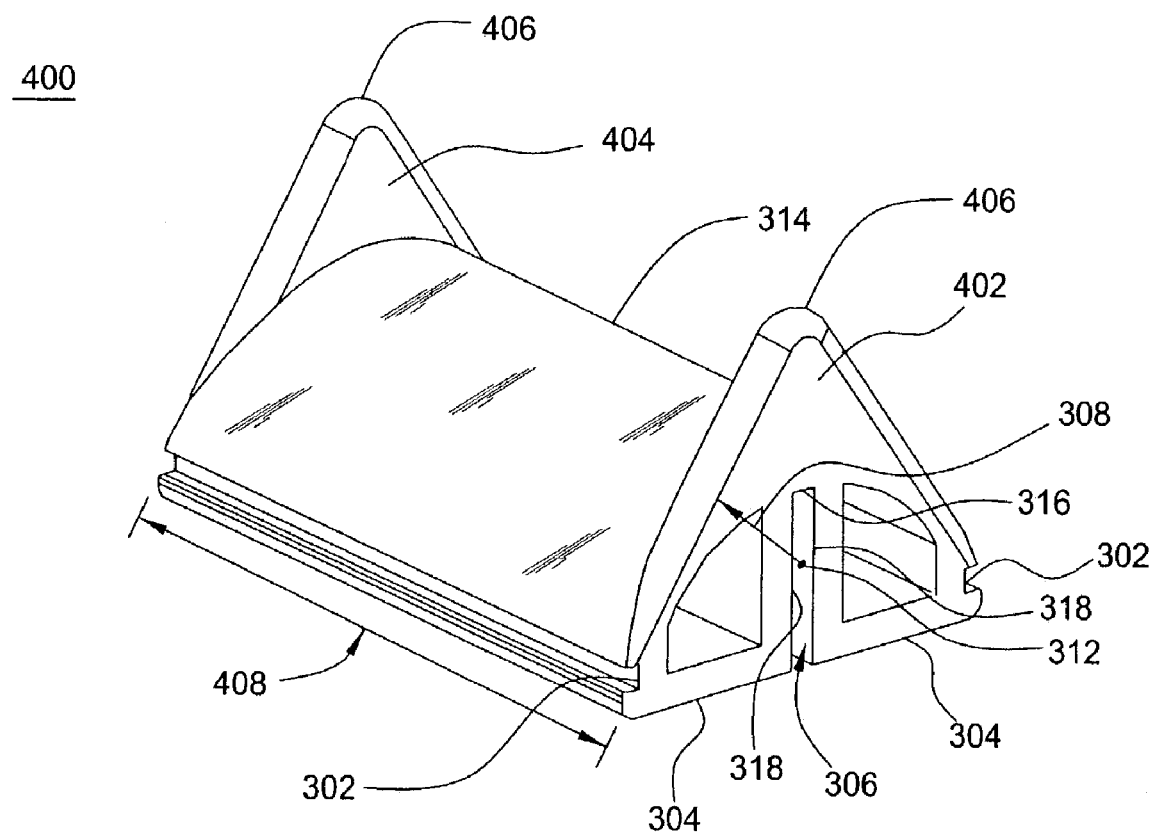
FIG. 4 depicts a perspective view of another embodiment of the invention.

FIG. 4 depicts a perspective view of another illustrative embodiment of the bend limiter 108. FIG. 4 depicts similar elements to those depicted in FIG. 3. FIG. 4 depicts bend limiter 400 having an arcuate surface 314, a front face 402, a rear face 404, an arcuate surface longitudinal length 408, and a maximum extension region 406. In addition, substantially parallel inner walls 314, an inner wall 316 substantially perpendicular to walls 314, a central recess 306, two opposed peripheral recesses 302, flanges 304, and a bend radius 308 extending from a central point 312 to the arcuate surface 314 are shown. Many of the elements in FIG. 4 have already been described with respect to FIG. 3. For brevity, the elements already described in FIG. 3 will not be repeated in the discussion of FIG. 4. When necessary, the reader is encouraged to refer to FIG. 3.

The embodiment depicted in FIG. 4 differs from the embodiment depicted in FIG. 3 in that the bend limiter 400 contains a front face 402 and rear face 404 that extend beyond the arcuate surface 314. Front face 402 and rear face 404 extend beyond the arcuate surface 314 to a maximum extension point 406. Bend limiter 400 serves to prevent optical fibers from falling off of the arcuate surface 314 of bend limiter 400. Front face 402, rear face 406, and maximum extension point 406 are depicted as substantially normal to the arcuate surface 314. However, any angle formed between front and rear face 402 and 404 respectively may be used that is sufficient to prevent optical fibers from falling off of the arcuate surface 314 of the bend limiter 400. In addition, front and rear face, 402 and 404, respectively may have any dimensions, which extend away from arcuate surface 314.

Figure 5:
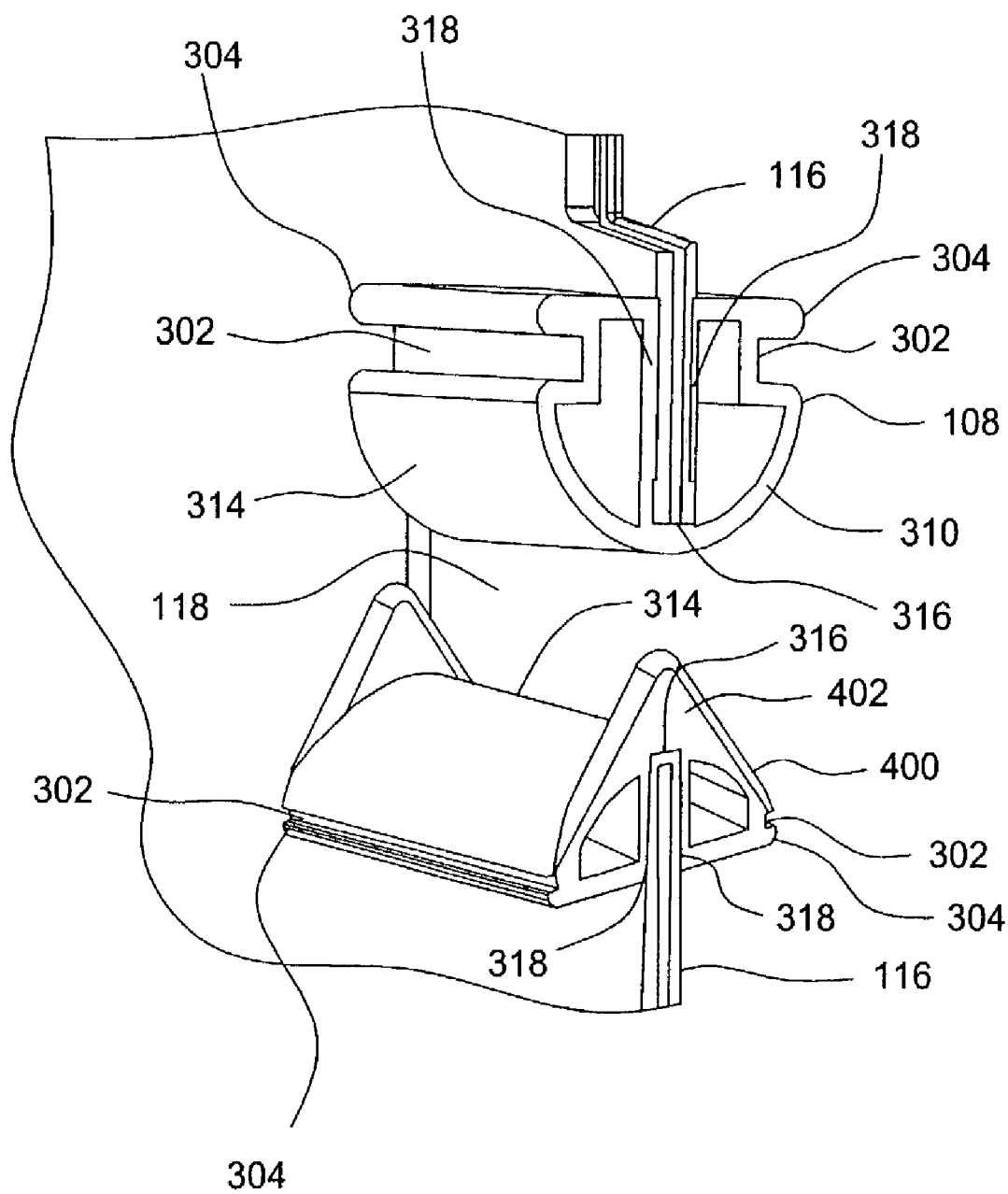
FIG. 5 depicts a portion of an optical fiber closure adapted for use with embodiments of the invention.

While FIGS. 1 and 2 depict two bend limiters 108 within the same aperture 118, FIG. 5 serves to illustrate that various bend limiter embodiments of the invention may be used simultaneously. Specifically, FIG. 5 depicts bend limiters 108 and 400 inserted within the same aperture 118 of sidewall 116. Each respective bend limiter 108 and 400 operates within the aperture 118 of sidewall 106 as discussed above with respect to FIGS. 1–4. For brevity, the operations already discussed, in FIGS. 1–4, will not be repeated in the discussion of FIG. 5.

In another embodiment, two opposed bend limiters 400 are inserted into aperture 118 of sidewall 116. In this embodiment, there is sufficient space between the maximum extension points 406 of each respective opposed bend limiter 400 for the insertion of optical fibers.

While the foregoing is directed to illustrative embodiments of the invention, other and further embodiments of the invention may be devised without departing from the basic scope thereof, and the scope thereof is determined by the claims that follow.

What is claimed is:

1. An apparatus, comprising:
    an arcuate portion adapted to receive an optical fiber in a manner avoiding the optical fiber exceeding a minimum bend radius;
    first and second substantially parallel inner walls terminating at a third inner wall, wherein said third inner wall is substantially perpendicular to said first and said second wall thereby defining a recess within said apparatus for inserting a wall of an optical closure therein, the recess being centrally located with respect to said arcuate portion; and
    a first longitudinal flange and an opposed second longitudinal flange at either side of said arcuate portion, each of said flanges are a distance from said arcuate portion thereby forming opposed respective peripheral recesses;
    wherein said peripheral recesses are substantially perpendicular to said central recess;
    wherein said central recess is substantially equidistant to said peripheral recesses.

2. The apparatus of claim 1, wherein each of said peripheral recesses has a depth of about a ¼ inch.

3. The apparatus of claim 1 wherein said bend radius is about 1 to about 1.5 inches.

4. The apparatus of claim 1 wherein said central recess has a depth of about a ½ inch.

5. The apparatus of claim 1 further comprising:
    a front and rear face containing extended portions, said extended portions form an angle with said arcuate portion for preventing an optical fiber from falling off of said apparatus.

6. An apparatus according to claim 1, wherein said arcuate portion comprises an arcuate surface spanning an angular distance of approximately 180 degrees.

7. An apparatus according to claim 1, wherein said peripheral recesses have a depth substantially shorter than the depth of said central recess.

8. An apparatus, comprising:
    an arcuate portion adapted to receive an optical fiber in a manner avoiding the optical fiber exceeding a minimum bend radius;
    first and second substantially parallel inner walls terminating at a third inner wall, wherein said third inner wall is substantially perpendicular to said first and said second wall thereby defining a central recess within said apparatus for inserting a wall of an optical closure therein; and
    a first longitudinal flange and an opposed second longitudinal flange at either side of said arcuate portion, each of said flanges are a distance from said arcuate portion thereby forming opposed respective peripheral recesses;
    wherein said central recess is substantially equidistant to said peripheral recesses.

9. The apparatus of claim 8 wherein said peripheral recesses are substantially perpendicular to said central recess.

10. The apparatus of claim 8 comprising:
    a front and rear face containing extended portions, said extended portions form an angle with said arcuate portion for preventing an optical fiber from falling off of said apparatus.

* * * * *